Feb. 28, 1956   J. J. RODTH   2,736,466
LIQUID METERING AND DISPENSING DEVICE
Filed Oct. 11, 1950   2 Sheets-Sheet 1
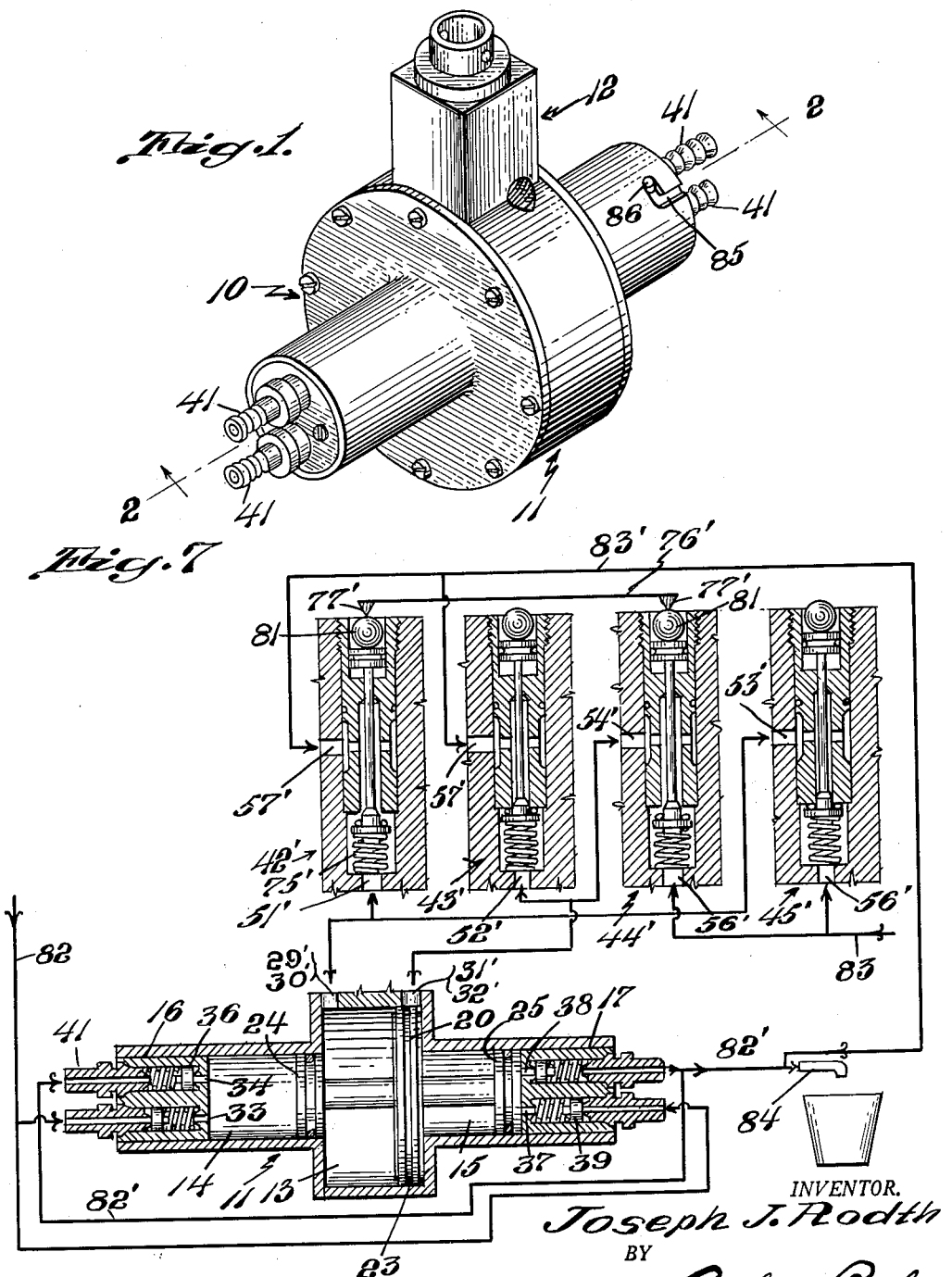
INVENTOR.
Joseph J. Rodth
BY
Barlow & Barlow
ATTORNEYS.

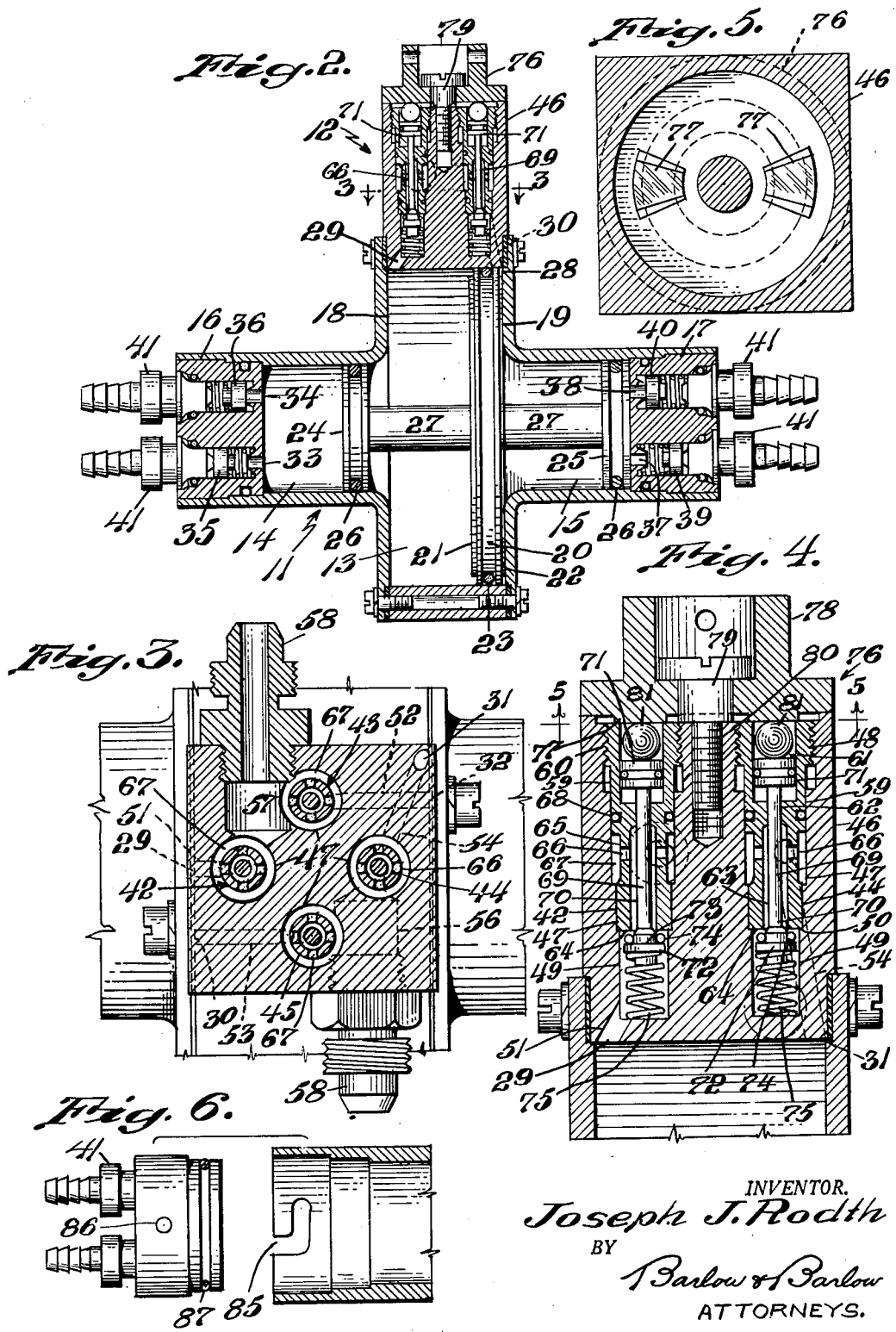

2,736,466
LIQUID METERING AND DISPENSING DEVICE

Joseph J. Rodth, Swansea, Mass.

Application October 11, 1950, Serial No. 189,573

5 Claims. (Cl. 222—136)

This invention relates to a metering device for measuring and dispensing two different liquids.

An object of the invention is to provide a device of the above character wherein two different liquids may be dispensed therefrom simultaneously in measured quantities.

Another object of the invention is to provide a device of the above character wherein two different liquids may be dispensed therefrom in measured quantities and in which one of said liquids may have a much greater specific gravity than the other liquid.

Another object of the invention is to provide a device of the above character wherein two different liquids may be dispensed and in which one of said liquids may be under pressure and employed as a force for operating the device.

A more specific object of the invention is to provide a metering device particularly adapted for use in a carbonated beverage dispenser.

Another object of the invention is to provide a metering device particularly adapted for dispensing a syrup and carbonated water in measured quantities and in which the metering chambers may be interconnected as to employ the the carbonated water for washing the walls of the syrup chamber.

Another object of the invention is to provide a metering device for dispensing two liquids in measured quantities in which the action of dispensing the said liquids will simultaneously reload the device for a subsequent cycle of operation.

With these and other objects in view, the invention consists of certain novel features of construction, as will be more fully described and particularly pointed out in the appended claims.

In the accompanying drawings:

Figure 1 is a perspective view of a metering device embodying my invention;

Figure 2 is a central sectional view taken substantially along lines 2—2 of Figure 1 looking in the direction of the arrows;

Figure 3 is a sectional view taken substantially along lines 3—3 of Figure 2 on an enlarged scale;

Figure 4 is a sectional view of the upper portion of the mechanism shown in Figure 2 but on an enlarged scale;

Figure 5 is a sectional view taken substantially along lines 5—5 of Figure 4 looking in the direction of the arrows;

Figure 6 is an exploded view of one end portion of the device; and

Figure 7 is a diagrammatic view showing the device as employed in a system for measuring a quantity of syrup and carbonated water to produce a carbonated beverage.

Referring to the drawings for a detailed description of the invention, 10 designates generally a metering device constructed so as to be particularly adapted for use in a machine for dispensing a carbonated drink. The said device has other applications and is not necessarily limited in use to the above machine. The device comprises a metering unit 11 and a reversible valve mechanism unit 12 operable for controlling the operation of said unit 11. Both of said units are enclosed in a single casing shown in Figure 1. The said metering unit 11 (see Figure 2) has a large centrally disposed cylindrical chamber 13, on either side of which there extends two smaller and similar cylindrical chambers 14, 15 closed at their outer ends by plugs 16, 17 and opening at their inner ends into said larger chamber 13 and providing therewith shoulders 18, 19. A piston 20 having reduced side portions 21, 22 is reciprocally mounted in the said chambers 13 and carries a packing ring 23 for preventing leakage between the walls of said chamber 13 and said piston. Pistons 24, 25 are similarly mounted in the smaller chambers 14, 15 and each carries a packing ring 26 for preventing leakage between the walls of said chambers 14, 15 and the said pistons. The said pistons 20, 24, 25 may be integrally or otherwise connected to each other by means of stems 27 so as to move together in unison and in the same direction. At each end of the stroke of the piston 20, one reduced portion 21 or 22 thereof provides with the adjacent shoulder 18 or 19 an annular recess as at 28 on one side or the other of the said piston. The chambers are of a size to provide for a predetermined volume of liquid to be discharged from the chamber 13 and from one or the other chamber 14, 15 at each stroke of the said pistons. The said chamber 13 is provided with a plurality of ports 29, 30, 31 and 32 (see Figures 3 and 4) which open into the chamber 13 with the ports 29, 30 positioned at one end of said chamber 13 and the other of said ports positioned at the other end of the chamber so as to open into the said recesses 28 formed at the end of the stroke of said piston as previously described.

The plug 16 has two similar bores extending therethrough providing an inlet port 33 into the chamber 14 and an outlet port 34 therefrom. The said inlet is controlled by a spring-loaded valve 35 which permits but one-way flow into the said chamber 14, and the outlet 34 is similarly provided with a spring-loaded valve 36 which operates to permit only the outward flow from said chamber 14. The plug 17 is similarly constructed to provide inlet and outlet ports 37 and 38 which are similarly controlled by spring-loaded valves 39 and 40. The said ports are provided with suitable fittings 41 to which proper conduits may be attached.

The said valve mechanism unit 12 (see Figures 3 and 4) comprises four similar valves designated generally 42, 43, 44, and 45 which are mounted in the body 46. The body 46 has four similar bores 47 equally spaced from each other and are at equal distances radially from the center of said body 47. The upper portions of the said bores 47 are internally threaded as at 48. Each bore 47 is similarly reduced at its lower portion so as to provide a smaller bore 49 which provides at the junction with the upper portion of the bore, shoulders 50. The ports 29, 32 through conduits 51, 52, respectively (see Figure 3), communicate with the bore portions 49, and the ports 30, 31 through conduits 53, 54 communicate with the larger bores 47. A laterally extending bore 56 (see Figure 3) intersects the bores 49 for valves 45 and 44 and provides an inlet to said valve mechanism 12, while a similar bore 57 intersects the bores 47 for valves 42 and 43 and provides an outlet from said valve mechanism 12. Suitable pipe fittings 58 are threadedly secured in said bores 56, 57 for attaching suitable conduits thereto from supply sources not shown.

A sleeve 59 (see Figure 4) having a threaded outer or upper portion 60 will slide into the bore 47 to rest upon the shoulders 50 and is secured in position by threadedly engaging the upper portion of the said bore 47. The sleeve has three concentric bores 61, 62, and 63 extending therethrough. The bore 61 which is of the largest diameter is located at the outer end portion of the sleeve, while the bore 63 of next largest diameter is located at the inner end portion of the said sleeve with the smallest diameter bore between. The lower end of said sleeve provides a valve seat 64. This said sleeve also has an annular groove 65 and a plurality of radially extending openings 66 opening from the bore 63 to the grooves 65. The said groove 65 with the opposite wall of the bore 47 provides a recess 67 extending about the sleeve which communicates through the openings 66 with the bore 63. A packing ring 68 is positioned between the said sleeve and the wall of the bore 47. The upper end of conduits 53, 54 opens into the recesses 67 of valves 45, 44 and the bore 57 opens into the recesses 67 of valves 42, 43.

A valve member 69 has a stem 70, the outer end of which carries a piston 71. The other end portion of said stem 70 has an annular enlargement 72 providing a shoulder 73 upon which there is a ring 74 made of a yieldable material impervious to the liquid to be contained in said chamber 13. The said stem 70 extends through the bore 63 and is slidably received in the bore 62 with the piston 71 slidably positioned in the bore 61. The shoulder 73 with the packing ring 74 thereon is adapted to engage the said valve seat 64 and is resiliently urged toward said seat by means of a compression spring 75 interposed between the abutment 72 and the bottom of the bore 49.

The valves 42 through 45, inclusive, are arranged to be moved to their open position in pairs. To this end, a cam 76 which is provided with opposite radially extending projections 77 and a hollow stem portion 78 is rotatably mounted at the outer end of the body portion 46 by means of a stud 79 having a threaded shank 80 secured to the said body 46, as shown in Figures 2 and 4. Antifriction members 81 are located within the bore 61 and rest against the pistons 71 and project so as to be in the path of movement of projection 77 when the valves associated therewith are in the closed position. Upon the rotation of the cam 76 through ninety degrees, the said projection 77 will move into engagement with oppositely disposed members 81 to move the valve associated therewith to the open position.

The metering unit may be connected to the supply sources of the liquids to be metered and dispensed therefrom. By way of example and referring to Figure 7, the said unit may be employed in a machine for dispensing a carbonated beverage and interposed in the syrup and carbonated water conduits 82 and 83 and which conduits extend from supply sources not shown which may be a tank for the syrup and a closed container for supplying carbonated water under pressure. The valve mechanism 42 is shown diagrammatically in this Figure 7 and like parts previously described are indicated by similar but primed numbers. One side of the conduit 82 extends from the syrup supply source to be connected by the fittings 41 to the inlet ports 33 and 37. The other side 82' of the conduit 82 is connected through the fittings 41 to the outlet ports 34 and 38 and may extend therefrom to the point of delivery, such as a nozzle or spout 84. One side of the conduit 83 may extend from the said carbonated water supply under pressure to the inlet 56' and the other side 83' thereof from the outlet 57' and thence to the said spout 84. Assuming the cam 76 to have been turned a quarter turn to have opened valves 42 and 44, as shown in this Figure 7, carbonated water under pressure will pass through conduit 56', open valve 44, conduit 54', through port 31' into chamber 13 on the right hand of piston 20. The piston 20 under pressure of the charged water will be moved to the left and the water will flow in behind it and fill the chamber 13 on the right hand of piston 20. The movement of piston 25 to the left will cause a suction in chamber 15 behind the piston 25 to fill the same with a syrup from the syrup supply source.

Thus, chamber 13 will be filled with a predetermined quantity of charged water and chamber 15 with a predetermined quantity of syrup.

Upon the next quarter turn of the cam 76', valves 43' and 45' will be moved to open position, while valves 42' and 44' will be moved to closed position by the springs 75'. The chamber 13 on the right of piston 20 will now be opened through port 32', conduit 52', open valve 43' to the outlet port 57' which will relieve the pressure of the liquid in chamber 13 on the right of piston 20. Carbonated water will now flow through inlet 56', open valve 45', conduit 53', thence through port 30' into chamber 13 on the left of piston 20 to move the said pistons 20, 24, and 25 to the right. The movement of piston 20 to the right will force the charged water ahead of it to flow out through the now open port 32', as above pointed out, to discharge through conduit 83' into spout 84. The movement of the piston 25 to the right will also force or expel the syrup in chamber 15 ahead of the piston through outlet port 38 thence through conduit 82' to the spout 84. It will now be quite apparent that one side of the metering unit is being filled when the opposite side thereof is being emptied of its contents.

It is here pointed out that the smaller chambers 14, 15 open into the larger chamber 13 and at each stroke of the piston, one or the other of said chambers 14, 15 will be filled with the charged water at the rear of said pistons 24 and 25 to wash the walls of said smaller chambers of any syrup which may have adhered thereto, so as to enhance the reciprocation of the pistons mounted therein.

In order to provide for periodically cleaning the chambers 14 and 15 on the side of the said pistons exposed to the syrup, the plugs 16, 17 are detachably secured in position (see Figure 6). To this end, the end portions of the walls of the said chambers are provided with a bayonet slot 85 and the plugs with a suitable projection 86. The plug is slidably received in position and locked in place in a usual manner by means of said projection 86 and slot 85. A packing ring 87 is provided for sealing said plugs in place.

It will now be apparent that I have disclosed a device for simultaneously metering two liquids which may be different one from the other and in which one of said liquids may be under pressure whereby to hydraulically operate the device.

I claim:

1. A metering device for dispensing a measured quantity of two liquids comprising a body having walls forming adjacent cylinders opening one into the other, said cylinders having ports for the passage of the liquid into and out thereof, valve means for controlling the direction of flow of the liquid through said ports, a piston in each of said cylinders reciprocal therein and connected to each other to be reciprocated in unison in the same direction where upon movement of said pistons in one direction said cylinders will be filled with the said liquids and upon movement in the other direction, said liquids within said cylinders will be discharged therefrom in predetermined quantities, said pistons being connected to each other by a stem of a diameter less than said pistons whereupon liquid in one of said cylinders will flow in the other cylinder in the rear of the piston therein during the reciprocation of said pistons.

2. A metering device for dispensing a measured quantity of syrup and carbonated water for a carbonated beverage comprising a body having walls forming a central carbonated water cylinder and an aligned syrup cylinder at one end thereof and opening into said water cylinder, said syrup cylinder having an inlet and outlet port at one end thereof, a check valve in each of said ports for controlling the direction of flow of syrup through said ports, a piston in each of said cylinders reciprocal therein and connected together for reciprocal movement, valve means for controlling the flow of carbonated water to each side of the piston in said water cylinder to reciprocate said pistons, said syrup cylinder being open to the flow of carbonated water from said water cylinder to wash the walls of said syrup cylinder at the rear side of the piston therein during the reciprocation of said pistons.

3. A metering device for dispensing a measured quantity of syrup and carbonated water for a carbonated beverage comprising a body having walls forming a carbonated water cylinder and an aligned syrup cylinder opening into said water cylinder, ports in said cylinders for the passage of liquid in and out thereof, a piston in each of said cylinders reciprocal therein and connected together for reciprocal movement, means for controlling the flow of carbonated water to each side of the piston in said water cylinder for reciprocating said pistons, said syrup cylinder being open to the flow of carbonated water from said water cylinder to wash the walls of said syrup cylinder at the rear side of the piston therein during the reciprocation of said pistons.

4. A metering device for dispensing a measured quantity of syrup and carbonated water for a carbonated beverage comprising a body having walls forming a carbonated water cylinder and an aligned syrup cylinder opening one into the other, said syrup cylinder having an inlet and outlet port thereto, a check valve in each of said ports for controlling the direction of flow of syrup through said ports, a piston in each of said cylinders reciprocal therein and connected together for reciprocal movement, said body having a supply port for the carbonated water and a discharge port, a conduit from said supply port to each end portion of said water cylinder, a conduit from each end of said water cylinder to said discharge port, a normally closed valve in each of said conduits, said valves being arranged in pairs with one valve of each pair controlling the supply conduit on one side of the piston in said water cylinder and the other valve of each pair controlling the discharge conduit on the other side of the piston in said water cylinder, and cam means for moving said pairs of valves to open position, said syrup cylinder being open to the flow of carbonated water from said water cylinder to wash the walls of said syrup cylinder at the rear side of the piston therein during the reciprocation of said pistons.

5. A metering device for dispensing a measured quantity of syrup and carbonated water for a carbonated beverage comprising a body having a carbonated water cylinder and a syrup cylinder, a piston in said syrup cylinder reciprocal therein for discharging a quantity of syrup from said syrup cylinder, means for controlling the flow of syrup to and from said syrup cylinder, a piston in said water cylinder reciprocal therein for discharging a quantity of carbonated water from said water cylinder, means for controlling the flow of carbonated water to and from said water cylinder, and means connecting said cylinders for the flow of carbonated water to and from each other for washing the walls of said syrup cylinder at the rear of the syrup cylinder during the reciprocation of said pistons.

References Cited in the file of this patent

UNITED STATES PATENTS

| | | |
|---|---|---|
| 2,427,429 | Waite et al. | Sept. 16, 1947 |
| 2,533,281 | Oliveau | Dec. 12, 1950 |